July 24, 1951 — T. P. AVERETTE — 2,561,644

TRAILER DOLLY AND STEERING ARM THEREFOR

Filed May 22, 1947 — 2 Sheets-Sheet 1

INVENTOR.
Thomas P. Averette
BY
ATTORNEY

July 24, 1951 T. P. AVERETTE 2,561,644
TRAILER DOLLY AND STEERING ARM THEREFOR
Filed May 22, 1947 2 Sheets-Sheet 2
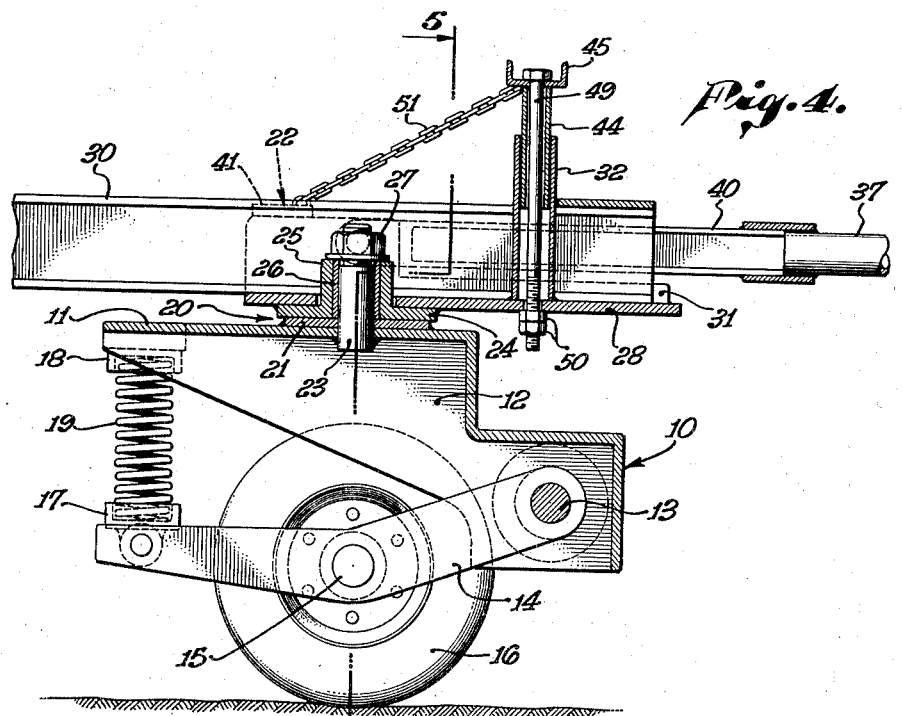
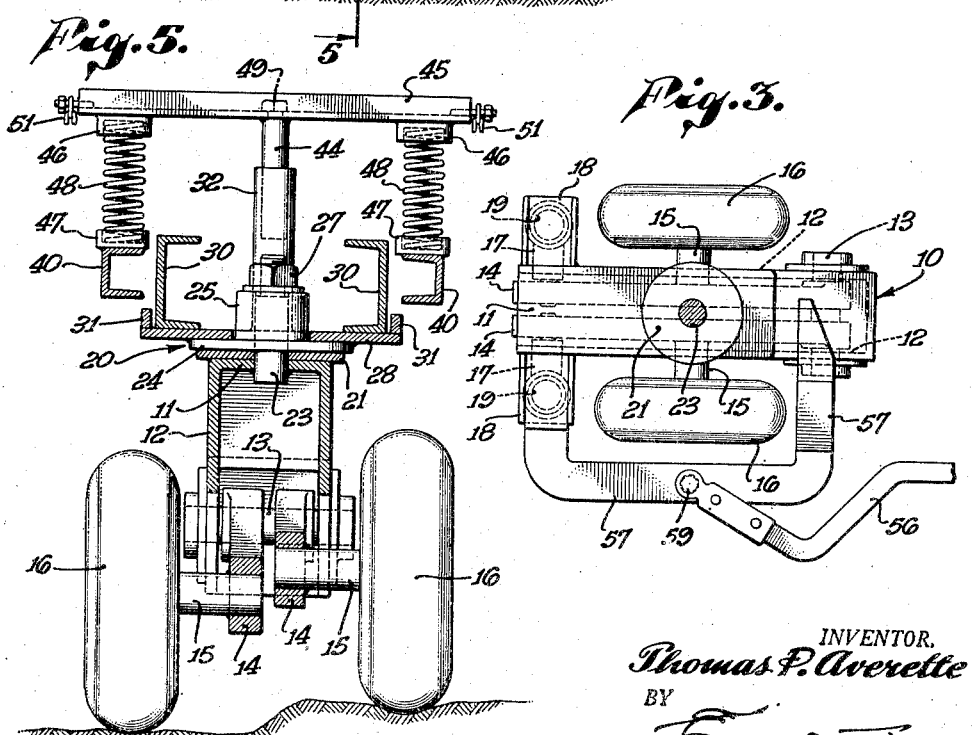
INVENTOR.
Thomas P. Averette
BY
ATTORNEY Patented July 24, 1951

2,561,644

UNITED STATES PATENT OFFICE 2,561,644

TRAILER DOLLY AND STEERING ARM THEREFOR

Thomas P. Averette, Bell, Calif.

Application May 22, 1947, Serial No. 749,749

9 Claims. (Cl. 280—33.5)

My invention relates to a dolly for supporting the forward end of a trailer vehicle and for connecting the trailer to a prime mover vehicle, and more particularly relates to dollies of the positively steered type, as distinguished from those of the caster type in which the dolly wheels merely follow the movement of the tractor vehicle by caster action.

My invention has as a purpose the provision of a positively steered dolly of easy riding qualities by which the modern elongated house-trailer or similar trailed vehicle may be easily and quickly converted to a semi-trailer, with consequent improvement in its riding qualities and reduction of strain on the prime mover.

Previous attempts to provide a dolly suitable for use with a trailer have employed caster type wheels with the result that violent swinging movement was imparted to the trailer as the caster wheels aligned themselves to new directions of travel. This movement could be easily accentuated by the initial resistance and sudden conformation of the wheels if two caster wheels were employed with a large trailer or on rough ground. When two wheels were fixed in parallel relation to the axis of the dolly and on an axle common to both, uneven terrain would cause tilting of the axle and transmit a binding strain to the so-called fifth wheel or other pivoting connection between the dolly and the trailer. Furthermore, when the dolly performed its function of supporting the trailer, it relieved the drawbar connection to the prime mover of the weight of the trailer, and not only deprived the prime mover of desirable added traction but could permit the drawbar to exert an upward pull.

A further purpose of my invention is to provide a dolly having a spring suspension which permits the dolly and a trailer secured thereto to be steered over uneven ground without binding either the means attaching the trailer to the dolly or the means attaching the dolly to a prime mover.

Another purpose of my invention is to provide a dolly which, while sustaining the weight of the forward end of a trailer and so relieving the prime mover of that weight, will yet transmit to its point of attachment to the prime mover a predeterminable downward force to increase the traction of the prime mover and decrease vertical motion thereof.

Yet another purpose of my invention is to provide a dolly capable of receiving and sustaining the weight of a trailer over a wide area of supporting surface rather than a localized point such as a ball and socket joint and yet requiring no fifth wheel on the trailer which would require lubrication, and be exposed to dirt when the trailer was parked separately from the dolly.

Broadly stated, my invention embodies a dolly frame having individually sprung knee-action wheels of fixed alinement with the frame and having both upper and lower elements of a fifth wheel element. The upper fifth wheel element is connected to the prime mover by a vertically pivotable drawbar urged downwardly by a suitably arranged spring, and the lower element is connected to the prime mover by a steering arm. A straight line towing hitch is thus achieved from the pivot point on the prime mover through the body of the trailer, subject to minimized vertical strains of calculable force, and the dolly is positively steered to a course paralleling that of the prime mover and so eliminates lateral stress and see-sawing of the trailer.

I will describe a preferred form of my dolly mechanism and will then point out the novel features thereof in claims.

In the accompanying drawings:

Fig. 3 is a plan view taken on the line 3—3 of Fig. 1, and illustrative of details of the lower portion of the dolly.

Fig. 4 is a longitudinal sectional view taken on the line 4—4 of Fig. 2 and on an enlarged scale.

Fig. 5 is a transverse sectional view taken on the line 5—5 of Fig. 4.

Figure 1:
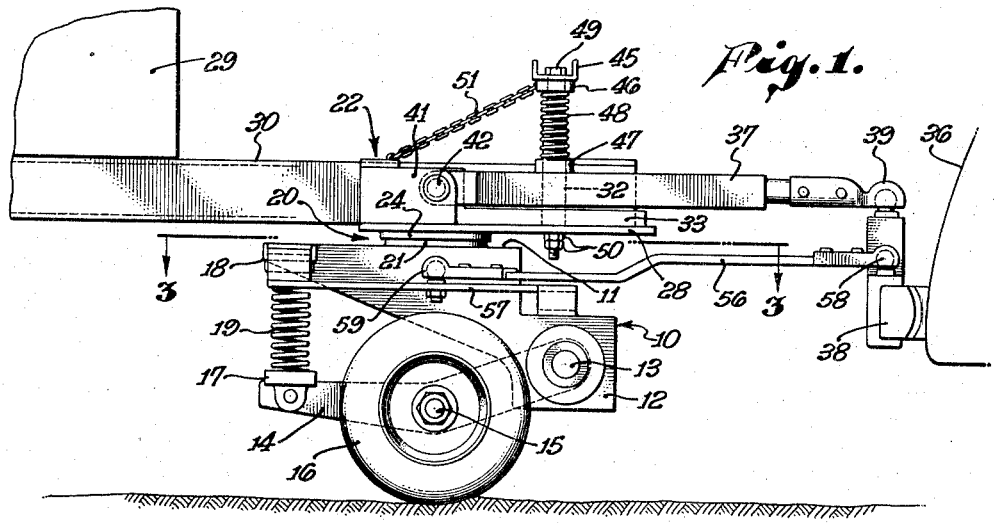
Fig. 1 is a side elevational view of my invention, showing it in operation as a connecting link between a prime mover and a trailer.

Having specific reference to the details of the drawings, this embodiment of my invention comprises a dolly frame 10, having the general form of an inverted channel with a central cover plate 11 and lateral flanges 12 extending downwardly. The cover plate 11 is stepped downwardly at its forward end, as best shown in Fig. 4 and the lateral flanges 12 decrease in depth towards their rearward ends. A pivot pin 13 extends between the lower forward ends of the lateral flanges 12, and on it are pivoted a pair of arms 14 extending rearwardly within the channel of the frame. At a point on each arm sufficiently rearward from the pivot pin 13 so that it will not make contact with the lateral flanges 12 in the hereinafter described movement, a stub axle 15 extends outwardly beyond the frame 10 and there carries a wheel 16. The arms 14 extend rearwardly beyond the stub axles 15 and at their rearward ends each carries an outwardly extending cup bracket 17. Inverted cup brackets 18 are secured, as by welding, to the rearward ends of the lateral flanges 12 in vertical opposition to the cup brackets 17. Coil springs 19, held by and between the brackets 17 and 18, control movement of the arms 14 individually.

As the pivot pin 13 is parallel to the transverse axis of the frame 10, the arms 14 and wheels 16 necessarily swing in vertical planes parallel to the longitudinal axis of the frame. As shown in Fig. 5, the individual mounting of the wheels and the individual spring suspension thereof permits knee action of each wheel when uneven terrain is encountered, and relatively little lateral torque is transmitted to the frame 10.

A fifth wheel 20 is secured to the frame 10 and comprises a bearing disc 21 welded to the cover plate 11 and an upper wheel element 22 held rotatably to the disc 21 by a kingpin 23 substantially in the vertical plane of the normal positions of the stub axles 15. The upper element 22 has a disc 24 provided with a bearing housing 25 and bearing 26 through which the kingpin 23 extends. The kingpin 23 may be secured, as by welding to the frame 10 and is provided with a lock-nut 27. A platform 28, forming part of the upper wheel element 22 and rotatable therewith is secured to the disc 24, as by welding, and provides a support for the forward end of the trailer shown at 29.

It will be understood that trailers have drawbar connections of many various types and that my invention contemplates the use of any suitable means for securing such drawbar connections or the forward end of the trailer itself to the platform 28. When hereinafter I refer to the forward end of a trailer, it is to be further understood that I mean to include in such reference the trailer drawbar as a constituent part of the trailer. For illustrative purposes, a trailer drawbar 30 is shown as of V type. Such a drawbar may rest upon the platform 28 and be held in rigid alinement therewith by flanges 31 arranged convergently on the platform. It may be restrained from longitudinal rearward movement by having its forward end hooked over a tubular column 32 which is welded to the platform 28 and forms part of the upper wheel element 22, and may be restrained from forward longitudinal movement by a stop 33 at the forward end of the platform 28 as well as by the forwardly convergent flanges 31. Various methods of securing other types of trailers will occur to those skilled in the art, it being important for the proper operation of my invention only that the trailer and the upper wheel element 22 be secured in substantially rigid longitudinal alinement.

To connect the dolly with a prime mover, indicated at 36, I provide a drawbar 37 which is attachable to the prime mover, as to the rear bumper 38 thereof, by a conventional ball and socket connection 39, or other suitable device providing a universal pivot. The drawbar 37 is bifurcated rearwardly, with forked arms 40 divergent to allow the trailer drawbar 30 and the platform 28 to be disposed between them with ample clearance. Brackets 41, mounted on the rearward ends of the flanges 31, are provided with horizontal pivot pins 42. The rearward ends of the forked arms 40 are pivoted on the pivot pins 42. Consequently a tow hitch is formed by the drawbar 37, upper wheel element 22, trailer drawbar 30, and trailer 29, which is universally pivoted at the ball and socket connection 39 but is laterally rigid throughout its length. The forward portion of this tow hitch, constituted by the drawbar 37, is, however, vertically pivotable at both its ends, to allow for relative vertical movement of the dolly and the prime mover 36.

Excessive vertical pivoting of the drawbar 37 is damped, and downward pressure is exerted on the ball and socket connection 39 by a spring device connecting the drawbar 37 and the platform 28. The tubular column 32 slidably engages a hollow plunger 44 which has a channel beam 45 welded to its upper end. Inverted spring cups 46 on the under side of the channel beam 45, and upright spring cups 47 on the forked arms 40 engage the ends of coil springs 48 to urge the channel beam 45 to an elevated position relative to the drawbar 37. A bolt 49 extends through the channel beam 45, hollow plunger 44, tubular column 32 and platform 28, and is provided with adjustment nuts 50 by which the initial compression of the springs 48 may be regulated to a desired amount. When the forward end of the trailer rests on the upper wheel element 22, the weight of the trailer is sustained by the dolly wheels 16, and the upper wheel element and the forward end of the trailer will be in parallel planes. The drawbar 37 does not sustain the weight of the trailer but, due to the springs 48, will at all times exert a downward pressure on the ball and socket connection 39. This pressure will vary with the vertical angularity of the drawbar 37 and upper wheel element 22, but may be adjusted by the nuts 50 to be of predetermined value for a normal operating position of the prime mover, dolly, and trailer corresponding to travel over a smooth road.

The channel beam 45 may be held in its transverse position relative to the drawbar 37 by any suitable means, such as chains 51 secured to the ends of the channel beam and to the brackets 41.

To provide for steering the dolly, a steering arm 56 is connected to the prime mover 36 and to a steering bracket 57 by universal pivot elements such as the ball and socket connections 58 and 59. The bracket 57 may be an extension of one of the cup brackets 18, extending forwardly outside the vertical pivot range of the adjacent wheel 16 and inwardly to a welded connection to the lower forward portion of the dolly frame 10. If arranged so that straight lines joining the connection 58, the connection 59, the kingpin 23 and the connection 39 form a parallelogram, the dolly wheels 16 will always be positively steered in courses parallel to the rear wheels of the prime mover 36, responding to turning movement of the prime mover. On the other hand the lateral spacing of the connection 58 from the connection 39 may be made greater or less than the lateral spacing of the connection 59 from the kingpin 23, with corresponding changes in the length of the steering arm 56, to provide less or greater response of the dolly wheels to the turning movement of the prime mover.

Figure 2:
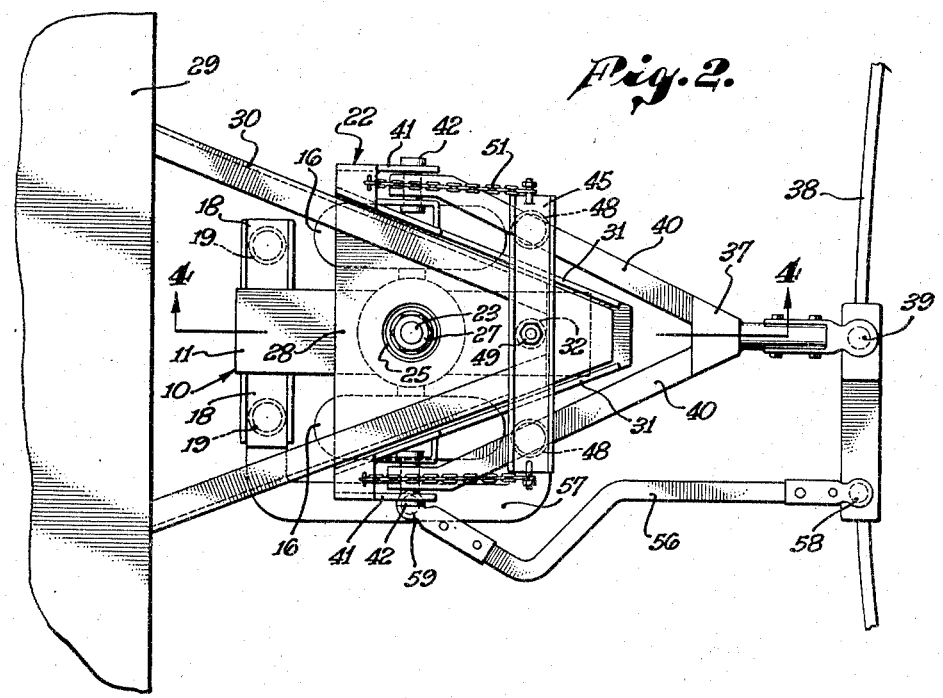
Fig. 2 is a plan view of my invention.

Steering arm 56 has an outwardly offset portion 56a, which is provided for the purpose of allowing unrestricted movement of the dolly in a clockwise direction as when viewed in Fig. 2, since without the offset portion, that is with the arm straight, certain parts of the dolly would strike the steering arm and thus limit turning movement of the dolly in such direction. This would naturally result in so restricting steering of the trailer by the prime mover in backing or pulling as to render the device entirely unpractical in use.

To attach a trailer to a prime mover by means of this invention it is merely necessary to connect the dolly to the prime mover by means of the drawbar 37 and steering arm 56, which may be done before or after the trailer is secured to the dolly and to remove temporarily the channel beam 45 so that the trailer drawbar 30 may be hooked over the tubular column 32 and brought into engagement with the flanges 31. If not already attached to the prime mover, the dolly may be tilted to assist in this operation. When the trailer drawbar 30 is placed as above described the channel beam 45 is replaced with its attached hollow plunger 44 within the tubular column 32, the bolt 49 is placed in position and the nuts 50 are tightened to exert the desired compression on the springs 48.

Although I have herein shown and described only one form of trailer dolly embodying my invention, it is to be understood that various changes and modifications may be made therein without departing from the spirit of my invention and the spirit and scope of the appended claims.

I claim:

1. A dolly for supporting the forward end of a trailer and for forming a hitch between said trailer, and a prime mover, comprising: a frame; wheels on said frame held in parallel relation to the longitudinal axis thereof and individually movable in vertical planes; spring means individual to each of said wheels; platform means rotatably secured to said frame for receiving the forward end of said trailer and forming a fifth wheel therefor; drawbar means attachable to said prime mover so as to pivot universally thereon and secured to said platform means so as to be pivotable vertically with respect thereto and forming with said platform means and with the forward end of said trailer a laterally rigid towing hitch for said trailer; spring means associated with said platform means for exerting downward pressure on said drawbar means; and a steering arm connecting said frame and said prime mover at points spaced laterally from the axis of said towing hitch.

2. A dolly for supporting the forward end of a trailer and for forming a hitch between said trailer and a prime mover, comprising: a frame; wheels on said frame having axles parallel to the transverse axis of said frame and arranged to be individually arcuately movable in vertical planes; spring means individual to each of said wheels; a fifth wheel carried by said frame having an upper element adapted to secure and to support the forward end of said trailer vehicle; drawbar means attachable to said prime mover so as to pivot universally thereon and forming with said fifth wheel and the forward end of said trailer a laterally rigid towing hitch for said trailer; resilient means carried by said upper element of said fifth wheel for exerting a downward pressure on said drawbar means independently of the weight of said trailer; and means for steering said frame in response to turning movement of said prime mover.

3. A dolly for supporting the forward end of a trailer and for forming a hitch between said trailer and a prime mover, comprising: a wheeled frame; a fifth wheel carried by said frame having an upper element adapted to secure and support the forward end of said trailer and to prevent horizontal motion thereof relative to said fifth wheel; drawbar means attachable to said prime mover so as to pivot universally thereon and forming with said fifth wheel and the forward end of said trailer a laterally rigid towing hitch for said trailer; resilient means carried by said upper element of said fifth wheel for exerting a downward pressure on said drawbar means independently of the weight of said trailer; and means for steering said frame in response to turning movement of said prime mover.

4. A dolly for supporting the forward end of a trailer and for forming a hitch between said trailer and a prime mover, comprising: a frame; horizontal pivot means on said frame parallel to the transverse axis thereof; arm means pivotable on said pivot means; wheel means mounted on said arm means; spring means mounted to bear against said arm means and said frame so as to provide knee action for said wheel means; a fifth wheel carried by said frame having an upper element adapted to secure and support the forward end of said trailer and to prevent horizontal movement thereof relative to said fifth wheel; drawbar means attachable to said prime mover so as to pivot universally thereon and forming with said fifth wheel and the forward end of said trailer a laterally rigid towing hitch for said trailer; resilient means carried by said upper element of said fifth wheel for exerting a downward pressure on said drawbar means independently of the weight of said trailer; and means for steering said frame in response to turning movement of said prime mover.

5. A dolly for supporting the forward end of a trailer and for forming a hitch between said trailer and a prime mover, comprising: a frame; wheels on said frame held in parallel relation to the longitudinal axis thereof; platform means rotatably secured to said frame for receiving the forward end of said trailer and forming a fifth wheel therefor; drawbar means attached to said platform and pivotally attachable to said prime mover and forming with said platform and with the forward end of said trailer a laterally rigid towing hitch for said trailer; and a steering arm connecting said frame and said prime mover at points spaced laterally from the axis of said towing hitch.

6. A dolly for supporting the forward end of a trailer and for forming a hitch between said trailer and a prime mover, comprising: a wheeled frame; a platform secured to said frame so as to be rotatable horizontally relatively thereto and to form therewith a fifth wheel; means on said platform for engaging the forward end of said trailer to prevent horizontal motion of said trailer relative to said platform; a drawbar bifurcated rearwardly and having means at its forward end for detachably engaging said prime mover so as to provide a universally pivoted connection therewith; pivot means on said platform engaging the rearward ends of said drawbar so as to permit vertical arcuate movement of the forward end of said drawbar; a beam member extending transversely of said drawbar and secured to said platform so as to have limited vertical movement relative thereto; and spring means engaging said beam member and said drawbar so as to exert a downward force on said drawbar forwardly of said pivot means.

7. A dolly for supporting the forward end of a trailer and for forming a hitch between said trailer and a prime mover, comprising: a frame; horizontal pivot means on said frame parallel to the transverse axis thereof; arm means pivotable on said pivot means; wheel means mounted on said arm means; spring means mounted to bear against said arm means and said frame so as to provide knee action for said wheel means; a fifth wheel carried by said frame having an upper element adapted to secure and support the forward end of said trailer and to prevent horizontal motion thereof relative to said fifth wheel; drawbar means attachable to said prime mover so as to pivot universally thereon and forming with said fifth wheel and the forward end of said trailer a laterally rigid towing hitch for said trailer; and means for steering said frame in response to turning movement of said prime mover.

8. A dolly for supporting the forward end of a trailer and for forming a hitch between said trailer and a prime mover, comprising: a frame; wheels on said frame held in parallel relation to the longitudinal axis thereof; platform means rotatably secured to said frame for receiving the forward end of said trailer and forming a fifth wheel therefor; drawbar means attached to said platform and pivotally attachable to said prime mover and forming with said platform and with the forward end of said trailer a laterally rigid towing hitch for said trailer; and a steering arm connecting said frame and said prime mover at points spaced laterally from the axis of said towing hitch, said arm having a portion bent laterally to afford horizontal clearance for that wheel at the arm side of the dolly when turning the frame in the direction of the arm so that irrespective of the level of the aforesaid wheel the frame can be turned to an extreme angle.

9. A dolly for supporting the forward end of a trailer and for forming a hitch between said trailer and a prime mover, comprising: a frame; wheels on said frame held in parallel relation to the longitudinal axis thereof; platform means rotatably secured to said frame for receiving the forward end of said trailer and forming a fifth wheel therefor; drawbar means attached to said platform and pivotally attachable to said prime mover and forming with said platform and with the forward end of said trailer a laterally rigid towing hitch for said trailer; a bracket secured to and extending laterally from said frame; and a steering arm connected to said bracket and said prime mover at points spaced laterally from the axis of said towing hitch, said arm having a portion bent laterally to afford horizontal clearance for both the bracket and that wheel at the arm side of the dolly when turning the frame in the direction of the arm so that the frame can be turned to an extreme angle.

THOMAS P. AVERETTE.

REFERENCES CITED

The following references are of record in the file of this patent:

UNITED STATES PATENTS

| Number | Name | Date |
|---|---|---|
| 1,294,859 | Arato | Feb. 18, 1919 |
| 2,258,678 | Elwood | Oct. 14, 1941 |
| 2,325,822 | Whitmer | Aug. 3, 1943 |
| 2,379,170 | McDaniel | June 26, 1945 |
| 2,410,241 | Schramm | Oct. 29, 1946 |
| 2,430,906 | Burt | Nov. 18, 1947 |